(12) United States Patent
McLain

(10) Patent No.: US 11,850,494 B2
(45) Date of Patent: Dec. 26, 2023

(54) MOBILE, DEPLOYABLE MULTI-FUNCTIONAL RECREATION STRUCTURE

(71) Applicant: Ninja Anywhere LLC, Ramsey, MN (US)

(72) Inventor: Joshua L. McLain, Ramsey, MN (US)

(73) Assignee: Ninja Anywhere LLC, Ramsey, MN (US)

( * ) Notice: Subject to any disclaimer, the term of this patent is extended or adjusted under 35 U.S.C. 154(b) by 124 days.

(21) Appl. No.: 17/314,849

(22) Filed: May 7, 2021

(65) Prior Publication Data

US 2021/0346776 A1 Nov. 11, 2021

Related U.S. Application Data

(60) Provisional application No. 63/021,265, filed on May 7, 2020.

(51) Int. Cl.

| | | |
|---|---|---|
| A63B 71/00 | (2006.01) | |
| B60P 3/00 | (2006.01) | |
| B62D 63/08 | (2006.01) | |
| A63B 69/00 | (2006.01) | |
| B60F 3/00 | (2006.01) | |
| A63B 17/04 | (2006.01) | |

(52) U.S. Cl.
CPC ...... *A63B 71/0036* (2013.01); *A63B 69/0048* (2013.01); *B60F 3/00* (2013.01); *B62D 63/08* (2013.01); *A63B 17/04* (2013.01); *A63B 2210/50* (2013.01); *A63B 2225/11* (2020.08)

(58) Field of Classification Search
CPC .............. A63B 23/03558; A63B 2225/10–105
See application file for complete search history.

(56) References Cited

U.S. PATENT DOCUMENTS

| | | |
|---|---|---|
| 3,620,564 A | 11/1971 | Wenger et al. |
| 4,134,755 A | 1/1979 | Maeda |
| 6,997,495 B1 | 2/2006 | Groezinger |
| 9,132,330 B2 | 9/2015 | Brendle |
| 9,192,867 B1 | 11/2015 | Sann |
| 9,308,410 B2 | 4/2016 | Beaver et al. |

(Continued)

FOREIGN PATENT DOCUMENTS

WO WO-2016039752 A1 * 3/2016 ............. A63B 17/02

*Primary Examiner* — Nyca T Nguyen
(74) *Attorney, Agent, or Firm* — Fredrikson & Byron, P.A.

(57) ABSTRACT

A deployable mobile trailer with multiple deployable walls is disclosed. The mobile trailer includes wheels rotatably coupled to a base and a frame attached to the base. The frame has vertical supports attached to the base and a top frame assembly disposed at a top end of the vertical supports. First and second elongate deployable walls are rotatably attached to respective first and second sides of the frame. The first and second walls include and are movable between respective retracted and deployed positions. A deployable end wall is rotatably attached to an end of the frame and has a retracted position and a deployed position between which it is movable. Multiple activity devices are removably attached to the top frame assembly, the first elongate deployable wall, the second elongate deployable wall, or the deployable end wall. A mobile activity structure and method for operating a mobile deployable activity structure are also provided.

17 Claims, 9 Drawing Sheets

(56) References Cited

U.S. PATENT DOCUMENTS

| | | | |
|---|---|---|---|
| 9,700,761 B2 | 7/2017 | Beaver et al. | |
| 9,750,999 B2 * | 9/2017 | Monaco | A63B 71/023 |
| 10,047,514 B2 * | 8/2018 | Sparks | E06B 3/32 |
| 11,071,899 B1 * | 7/2021 | Ajan | A63B 17/00 |
| 11,414,854 B2 * | 8/2022 | Jewell | E04B 1/3445 |
| 2002/0169052 A1 | 11/2002 | Godsey | |
| 2004/0159275 A1 | 8/2004 | Broderick et al. | |
| 2008/0280734 A1 * | 11/2008 | Dickie | A63B 22/0023 |
| | | | 482/54 |
| 2014/0106938 A1 * | 4/2014 | Sudeith | A63B 69/0048 |
| | | | 482/37 |
| 2016/0059104 A1 * | 3/2016 | Monaco | A63B 71/023 |
| | | | 280/30 |
| 2016/0059105 A1 * | 3/2016 | Scade Garcia | A63B 71/02 |
| | | | 52/64 |
| 2017/0209733 A1 * | 7/2017 | Beaver | B60S 9/02 |
| 2017/0296876 A1 | 10/2017 | Beaver et al. | |
| 2018/0028852 A1 * | 2/2018 | Beaver | A63B 71/0036 |
| 2018/0358919 A1 * | 12/2018 | Ansari | H02S 10/12 |
| 2020/0130559 A1 * | 4/2020 | Calabria | B62D 63/08 |
| 2020/0222780 A1 * | 7/2020 | Scala | B65D 88/121 |
| 2020/0230458 A1 * | 7/2020 | Dery | A63B 17/00 |
| 2021/0346776 A1 * | 11/2021 | McLain | B60P 3/00 |

* cited by examiner

MOBILE, DEPLOYABLE MULTI-FUNCTIONAL RECREATION STRUCTURE

CROSS-REFERENCE TO RELATED APPLICATION(S)

This application claims the benefit under 35 U.S.C. § 119(e) to U.S. Provisional Application 63/021,265, filed May 7, 2020 and entitled "Mobile, Deployable Multi-Functional Recreation Structure," which is hereby incorporated herein by reference in its entirety.

FIELD

The various embodiments herein relate to mobile entertainment, activity, and recreation systems.

BACKGROUND

Obesity rates continue to increase in the United States, and exercise options for people in remote areas are limited. Often, people do not exercise because they do not enjoy the options available to them.

Known mobile obstacle courses have several disadvantages, including time-consuming setup, limited space, and labor-intensive setup that requires two or more people.

There is a need in the art for an improved mobile activity system.

BRIEF SUMMARY

The embodiments disclosed and/or contemplated in this disclosure generally relate to mobile systems and methods for providing entertainment, activity, and recreation. Various implementations involve mobile systems that can be set up on many surfaces without special preparation, allow for optimization of activity space, and provide a frame from which various pieces of exercise equipment and/or obstacle devices may be hung. The mobile systems and methods include one or more elements that are deployable into an expanded configuration, thereby providing an increased activity space in comparison to an undeployed configuration.

A first example according to the disclosure includes a deployable mobile trailer. The deployable mobile trailer includes a base including wheels rotatably coupled to the base and a frame attached to the base. The frame has vertical supports attached to the base and a top frame assembly disposed at a top end of the vertical supports. The mobile trailer further includes a first elongate deployable wall rotatably attached to a first side of the frame, a second elongate deployable wall rotatably attached to a second side of the frame, and a deployable end wall rotatably attached to an end of the frame. Multiple activity devices are removably attached to the top frame assembly, the first elongate deployable wall, the second elongate deployable wall, or the deployable end wall.

According to this first example, the first elongate deployable wall has a retracted position and a deployed position such that the first elongate deployable wall is moveable between the retracted position and the deployed position. The second elongate deployable wall also includes a corresponding retracted position and deployed position such that the second elongate deployable wall is moveable between the retracted position and the deployed position. Further, the deployable end wall includes a retracted position and a deployed position such that the deployable end wall is moveable between the retracted position and the deployed position.

According to some implementations, in some cases the deployable mobile trailer includes a deployable activity device deployably attached to a deployable panel such that the activity device is disposed within the frame when the deployable panel is in the retracted position and deployed when the deployable panel is in the deployed position. In various implementations the deployable panel is the first elongate deployable wall, the second elongate deployable wall, or the deployable end wall. In some cases the deployable panel is the deployable end wall and the deployable activity device comprises a warp wall. In various implementations, the trailer also includes a climbing wall and a storage unit disposed at an end of the frame opposite from the deployable end wall. In such cases the climbing wall forms a wall of the storage unit and provides access to an internal portion of the storage unit.

According to further implementations, at least one of the first elongate deployable wall and the second elongate deployable wall includes a first side panel and a second side panel. The first and second side panels can be separately deployable. In some cases each of the first elongate deployable wall, the second elongate deployable wall, and the deployable end wall includes multiple panel legs. In such cases, each panel leg is deployed beneath and supports its respective deployable wall in the deployed position and is retracted within the frame in the retracted position. In some implementations the mobile trainer also includes first, second, and third actuable pistons. The first actuable piston is coupled to the first elongate deployable wall and the frame. The first actuable piston is operable to move the first elongate deployable wall between its retracted position and its deployed position. The second actuable piston is coupled to the second elongate deployable wall and the frame and is operable to move the second elongate deployable wall between its retracted position and its deployed position. The third actuable piston is coupled to the deployable end wall and the frame and operable to move the deployable end wall between its retracted position and its deployed position.

According to various implementations of the deployable mobile trailer of this example, the deployable end wall is rotatably attached to a first end of the frame and further has a second end wall attached to a second end of the frame opposite from the first end of the frame. The first elongate deployable wall extends along the first side of the frame from the deployable end wall to the second end wall. In addition, the second elongate deployable wall extends along the second side of the frame from the deployable end wall to the second end wall and the deployable end wall extends along the first end of the frame from the first side of the frame to the second side of the frame. In some implementations each of the first elongate deployable wall, the second elongate deployable wall, and the deployable end wall include a translucent or transparent sheet material attached to a wall frame.

Another example according to the disclosure includes a mobile activity structure. The mobile activity structure includes a frame attached to a base with wheels rotatably coupled to the base. The frame includes vertical supports attached to the base and a top frame assembly disposed at a top end of the vertical supports. The activity structure also includes a deployable end wall, a second end wall, and a deployable side wall. The deployable end wall is rotatably attached to a first end of the frame and has a retracted position and a deployed position such that the deployable end wall is moveable between the retracted position and the deployed position. The deployable end wall also includes an actuable piston coupled to the deployable end wall and the frame and operable to move the deployable end wall between the retracted position and the deployed position. The second end wall is attached to a second end of the frame opposite from the first end of the frame. The deployable side wall is rotatably attached to a side of the frame and extends along the side of the frame from the deployable end wall to the second end wall. The deployable side wall includes a retracted position and a deployed position such that the deployable side wall is moveable between the retracted position and the deployed position. The deployable side wall also includes an actuable piston coupled to the deployable side wall and the frame that is operable to move the deployable side wall between the retracted position and the deployed position. In addition, the mobile activity structure includes multiple activity devices removably attached to the top frame assembly, the deployable end wall, or the deployable side wall.

According to this second example, the mobile activity structure can further include a deployable activity device. The device is deployably attached to the deployable end panel such that the activity device is disposed within the frame when the deployable end panel is in the retracted position, and deployed when the deployable end panel is in the deployed position. In some cases the mobile activity structure also includes a storage unit disposed at the second end of the frame. In some such cases the second end wall forms one side of the storage unit and includes a climbing wall. In some such cases at least a portion of the second end wall is movably attached to the second end of the frame, thereby providing access to an internal portion of the storage unit.

According to some implementations, the deployable side wall is a first deployable side wall rotatably attached to a first side of the frame, and the structure further includes a second deployable side wall rotatably attached to a second side of the frame. The second deployable side wall extends along the second side of the frame from the deployable end wall to the second end wall and has a retracted position and a deployed position such that the second deployable side wall is moveable between the retracted position and the deployed position. The second deployable side wall also includes an actuable piston coupled to the second deployable side wall and the frame that is operable to move the second deployable side wall between the retracted position and the deployed position. In some cases of the mobile activity structure, each of the first deployable side wall, the second deployable side wall, and the deployable end wall has multiple panel legs. Each panel leg is deployed beneath and supports its respective deployable wall in the deployed position and is retracted within the frame in the retracted position.

Another example according to the disclosure includes a method for operating a mobile deployable activity structure. The method includes transporting a mobile activity structure in an undeployed configuration to a desired location. The mobile activity structure has multiple deployable walls rotatably attached to a frame supported by a rollable base and the frame includes a top frame assembly. The method also includes moving a first elongate deployable wall from a retracted position adjacent a first side of the frame to a deployed position, moving a second elongate deployable wall from a retracted position adjacent a second side of the frame to a deployed position, and moving a deployable end wall from a retracted position adjacent a first end of the frame to a deployed position. The method also includes removably attaching a plurality of activity devices to one or more of the top frame assembly and the plurality of deployable walls in the deployed positions.

In some implementations moving the deployable end wall to the deployed position includes moving a deployable activity device rotatably attached to the deployable end wall from a retracted position within the frame to a deployed position outside the frame. In some cases the deployable activity device is a warp wall. In some cases the method also includes accessing an internal portion of a storage unit disposed at a second end of the frame by moving at least a portion of a climbing wall that forms a wall of the storage unit. In some implementations the method further includes deploying the first elongate deployable wall by rotating first and second side panels of the first elongate deployable wall from the retracted position to the deployed position and deploying the second elongate deployable wall by rotating first and second side panels of the second elongate deployable wall from the retracted position to the deployed position. In some cases the method also includes moving the first elongate deployable wall from the deployed position into the retracted position, moving the second elongate deployable wall from the deployed position into the retracted position, moving the deployable end wall from the deployed position into the retracted position, and transporting the mobile activity structure in the undeployed configuration to a new desired location.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

DETAILED DESCRIPTION

Figure 1:
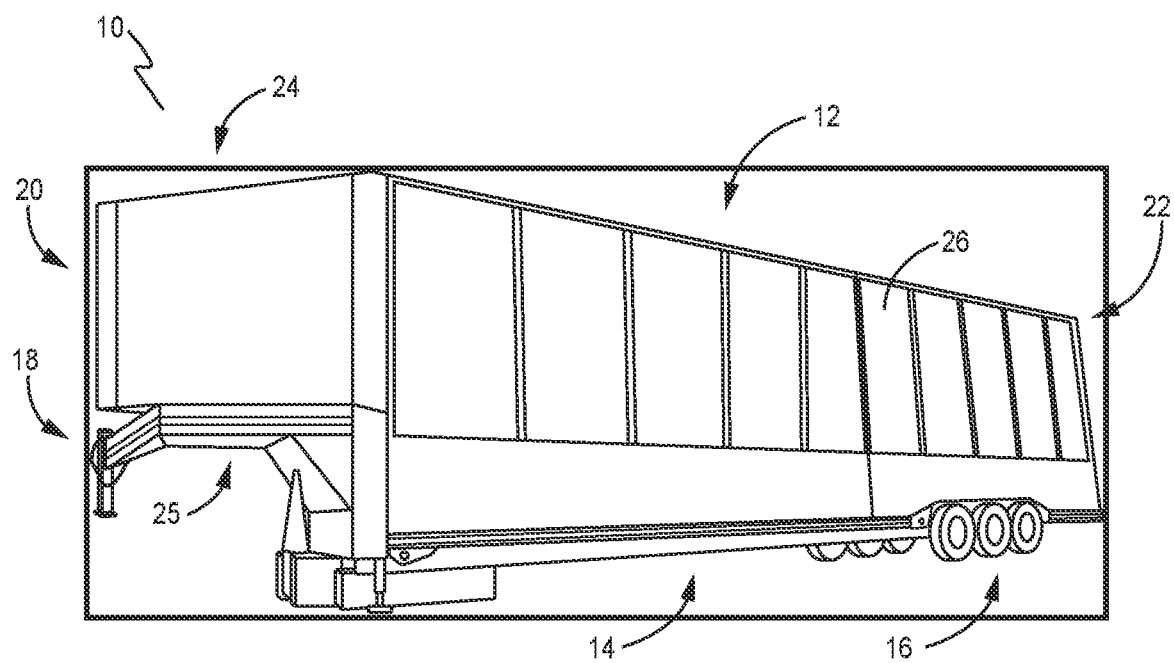
FIG. 1 is a perspective view of a mobile activity system in an undeployed configuration according to an embodiment.

The various embodiments disclosed or contemplated herein relate to mobile entertainment, activity, and recreation systems that are deployable into an expanded configuration, resulting in an increased activity space.

According to various embodiments as will be described herein, the instant systems are mobile, can be set up on many surfaces without special preparation, allow for optimization of activity space, and provide a frame from which various pieces of exercise equipment and/or obstacle devices may be hung. Further, the various exercise equipment and/or obstacles could be switched out for other types of equipment to cater to the population using this system.

According to one aspect of the disclosure, a deployable mobile trailer is described that includes multiple walls that can be deployed to increase the amount of usable activity space provided by the mobile trailer. In an example, the deployable mobile trailer includes a first elongate deployable wall, a second elongate deployable wall and a deployable end wall. The trailer also includes a base and wheels rotatably coupled to the base along with a frame attached to the base. In this example the frame has a number of vertical supports attached to the base and a top frame assembly disposed at a top end of the vertical supports and the first elongate deployable wall is rotatably attached to a first side of the frame. The first elongate deployable wall has a retracted position and a deployed position such that the first elongate deployable wall is moveable between the retracted position and the deployed position. The second elongate deployable wall is rotatably attached to a second side of the frame. Like the first elongate deployable wall, the second elongate deployable wall has a retracted position and a deployed position such that the second elongate deployable wall is moveable between the retracted position and the deployed position. In addition, the deployable end wall is rotatably attached to an end of the frame. The deployable end wall has a retracted position and a deployed position such that the deployable end wall is moveable between the retracted position and the deployed position In this example the deployable mobile trailer further includes a plurality of activity devices. The activity devices are removably attached to the top frame assembly, the first elongate deployable wall, the second elongate deployable wall, or the deployable end wall. The activity devices can be used by people within the enlarged activity space made available by the deploying of the first and second elongate deployable walls and the deployable end wall.

According to another aspect, the disclosure provides a mobile activity structure. The mobile activity structure includes a frame attached to a base with rotatably coupled wheels. The frame includes vertical supports attached to the base and a top frame assembly disposed at a top end of the vertical supports. A deployable end wall is rotatably attached to a first end of the frame. The deployable end wall has a retracted position and a deployed position such that the deployable end wall is moveable between the retracted position and the deployed position. The deployable end wall also includes an actuable piston coupled to the deployable end wall and the frame. The actuable piston is operable to move the deployable end wall between the retracted position and the deployed position.

According to this example, the mobile activity structure also includes a second end wall and a deployable side wall. The second end wall is attached to a second end of the frame opposite from the first end of the frame. The deployable side wall is rotatably attached to a side of the frame and extends along the side of the frame from the deployable end wall to the second end wall. In this example the deployable side wall has a retracted position and a deployed position such that the deployable side wall is moveable between the retracted position and the deployed position. The deployable side wall also includes an actuable piston coupled to the deployable side wall and the frame. The actuable piston is operable to move the deployable side wall between the retracted position and the deployed position.

Further, in this example the mobile activity structure includes a plurality of activity devices removably attached to the top frame assembly, the deployable end wall, or the deployable side wall. The activity devices can be used by people within an enlarged activity space made available by the deployable side wall and the deployable end wall.

According to another aspect of the disclosure, a method for operating a mobile deployable activity structure is provided. The method includes transporting a mobile activity structure in an undeployed configuration to a desired location. The mobile activity structure has multiple deployable walls that are rotatably attached to a frame. The frame is supported by a rollable base and includes a top frame assembly. The method further includes moving a first elongate deployable wall from a retracted position adjacent a first side of the frame to a deployed position and moving a second elongate deployable wall from a retracted position adjacent a second side of the frame to a deployed position. According to this example, the method also includes moving a deployable end wall from a retracted position adjacent a first end of the frame to a deployed position. The method also includes removably attaching a plurality of activity devices to one or more of the top frame assembly and the plurality of deployable walls in the deployed positions.

Turning to the drawings, further examples and implementations will be described. FIG. 1 depicts one embodiment of a mobile activity system or structure 10 in an undeployed configuration. More specifically, the system 10 in this embodiment is a transportable trailer 10 having a mobile frame 12 with a base 14, wheels 16, and a hitch 18 that allows for coupling the trailer 10 to a prime mover (not shown). The trailer 10 has a front end 20 and a rear end 22. At the front end 20, the trailer 10 has a storage unit 24 that, in this implementation, is an enclosed storage unit 24 that is disposed on or above the hitch arms 25 that extend from the frame 12 to the hitch 18.

In one embodiment, the base 14 and wheels 16 are configured such that the top of the base 14 is disposed at about 16 inches above the ground. At this height, users can easily step from the ground to the base 14 and back. Alternatively, the top of the base 14 is disposed at less than 30 inches above the ground.

Figure 2A:
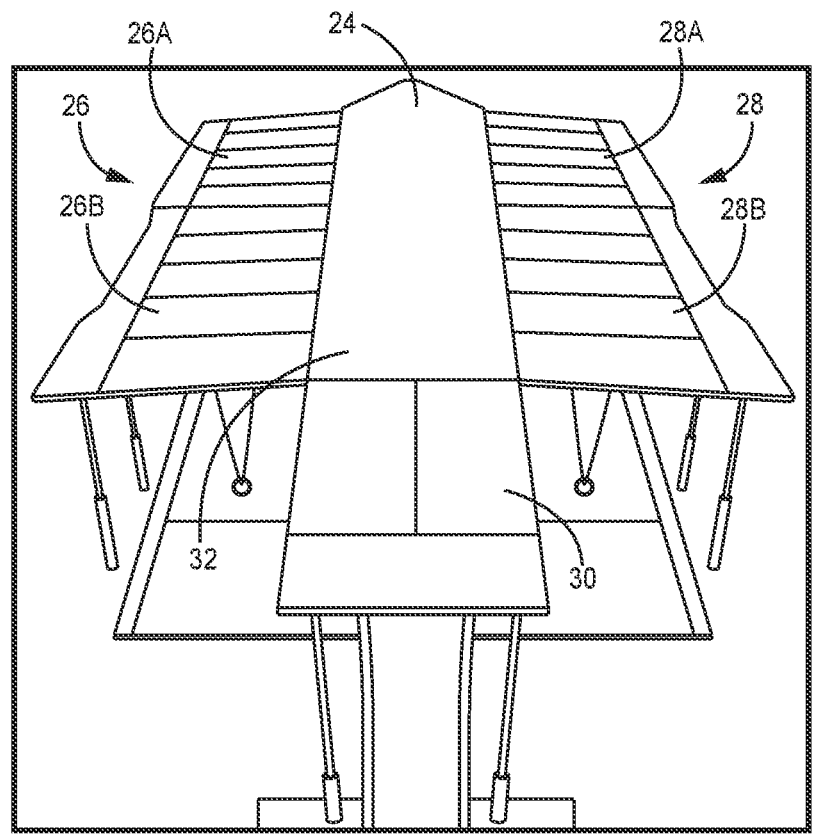
FIGS. 2A-2B are top perspective views of the mobile activity system of FIG. 1 in a deployed configuration according to an embodiment.
Figure 2B:
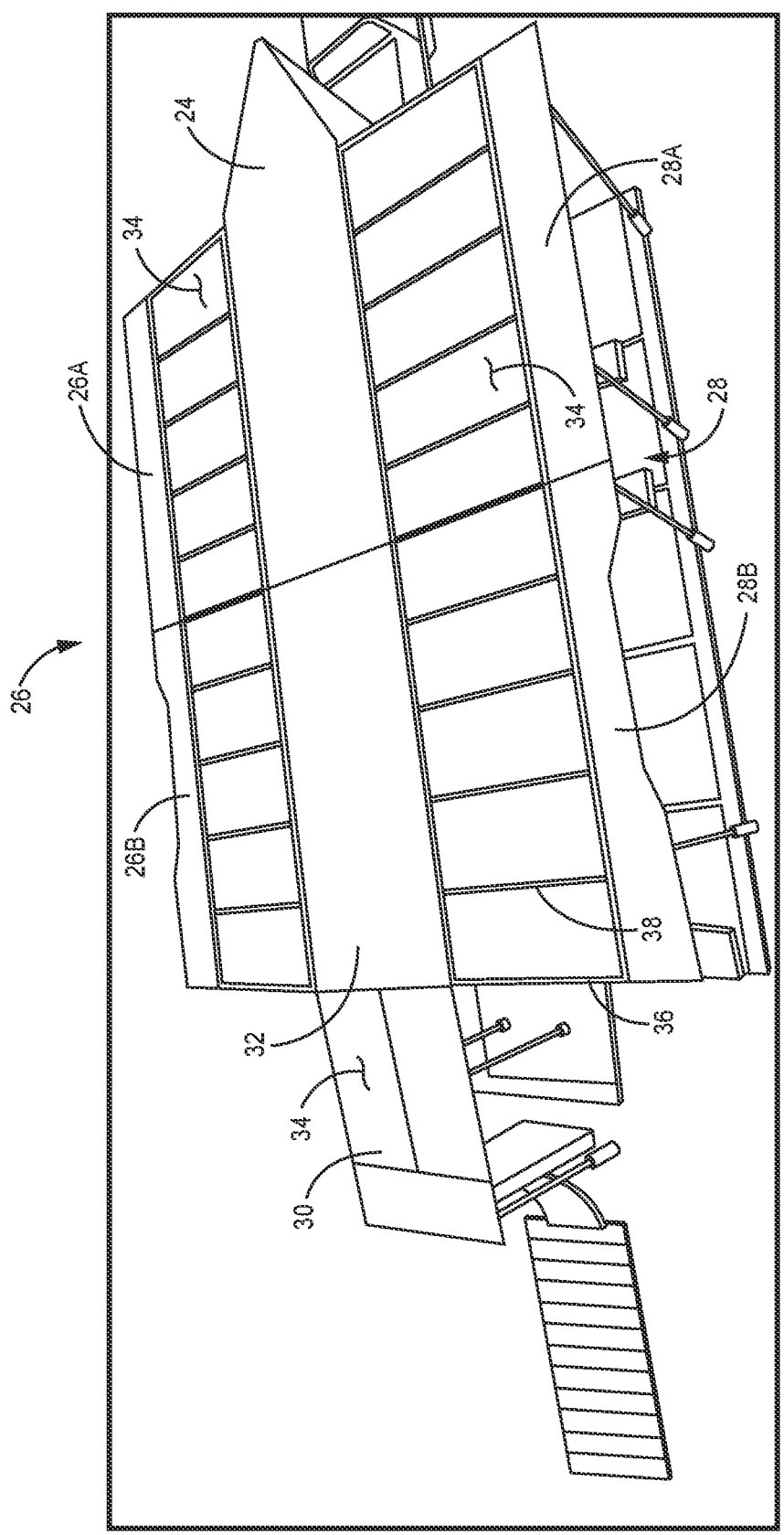
Figure 2C:
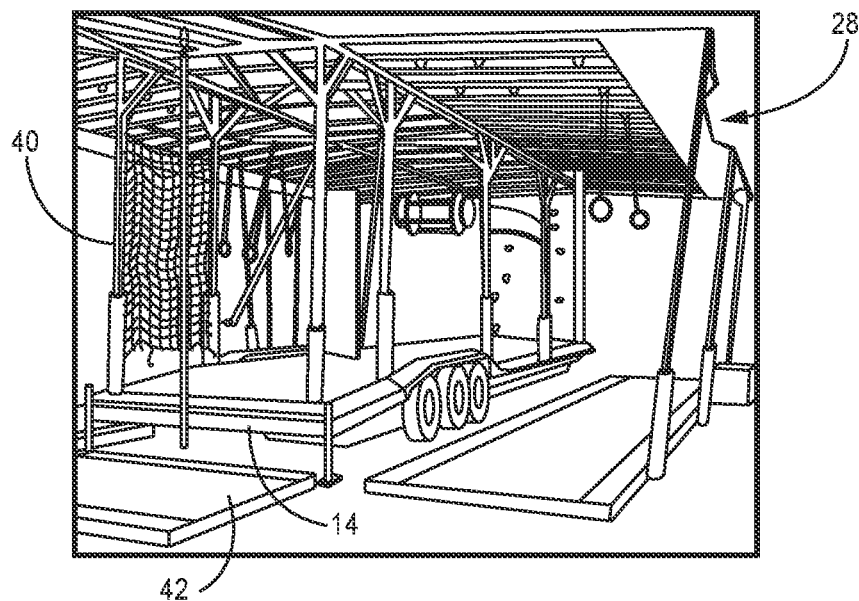
FIGS. 2C-2D are elevation views of the mobile activity system of FIG. 1 in the deployed configuration.
Figure 2D:
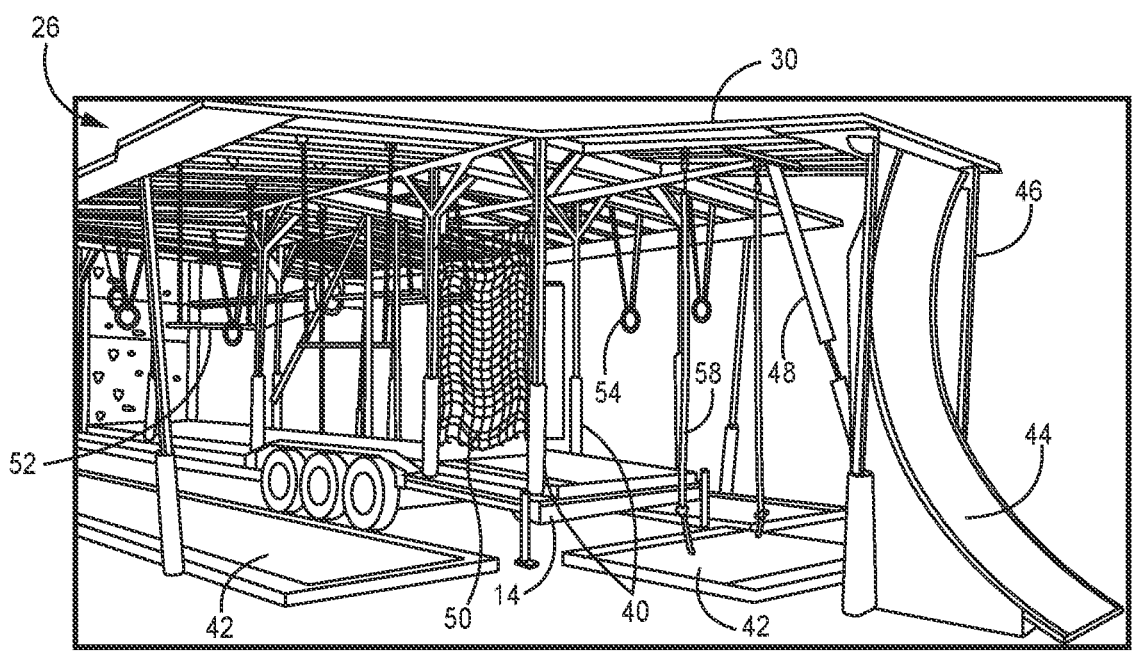
Figure 3A:
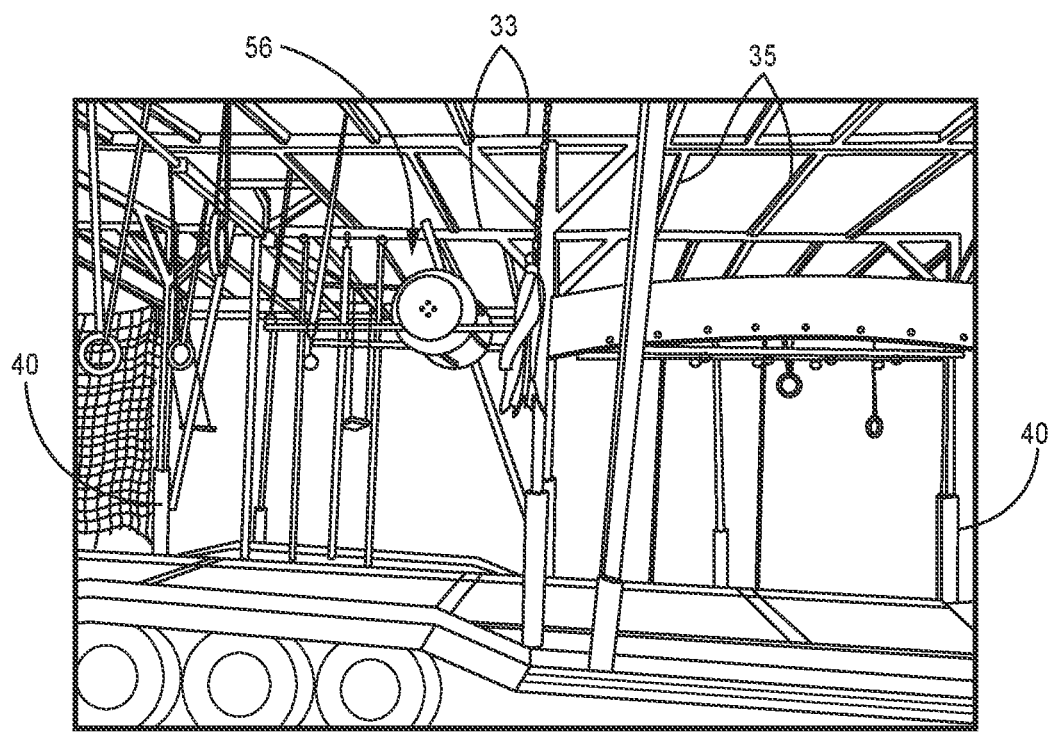
FIGS. 3A-3B are illustrations of various activity devices provided by the mobile activity system of FIG. 1 according to an embodiment.

In accordance with one embodiment, FIGS. 2A-2D and FIGS. 3A-3B depict the mobile activity system 10 in a deployed configuration. The frame 12 has vertical supports (or "frame legs") 40 (as best shown in FIGS. 2C and 2D) and a top frame assembly 32 attached to and disposed on top of the vertical supports 40, as best shown in FIGS. 2A and 2B. The vertical supports 40 extend from the base 14 to the top frame assembly 32 such that the vertical supports 40 support the top frame assembly 32. As best shown in FIG. 3A, the top frame assembly 32 has a top outer frame 33 (that forms the outer structure of the assembly 32) and crossbars 35 extending from one side of the outer frame 33 to the other.

As best shown in FIGS. 2A and 2B, the frame 12 supports deployable walls 26, 28, 30 that are part of the mobile activity system 10. In some cases, a mobile activity system has a frame that supports one, two, three or more deployable walls or panels. In the example shown in the figures, the activity system 10 has at least two elongate side walls (or "side panels") 26, 28, and an end or rear wall (or "end panel") 30, all of which are rotatably or hingedly coupled to the top frame assembly 32 such that the side walls 26, 28 and the end wall 30 are movable between their retracted or undeployed configurations (as shown in FIG. 1) and their extended or deployed configurations (as shown in FIGS. 2A-2D). The relationship between the walls 26, 28, 30 and the top frame assembly 32 and the deployment thereof will be described in further detail below.

As best shown in FIGS. 2A and 2B, in some cases, each of the side panels 26, 28 are actually made up of two panels 26A, 26B, 28A, 28B each. More specifically, in this example the first side wall 26 is made up of two side walls 26A, 26B, and the second side wall 28 is made up of two side walls 28A, 28B as shown. Alternatively, the side panels 26, 28 can be single panels, or they can be made up of three, four, or more panels.

As will be appreciated, in the deployed configuration as shown in FIGS. 2A-2D and 3A-3B, the system 10 provides an expanded space for an obstacle course that can be used by people for entertainment and exercise. More specifically, deploying the side walls or panels 26, 28 and the end or rear panel 30 in this example completely opens up three sides (e.g., panels or walls) of the activity system 10, thus greatly expanding the amount of available space, as well as providing a feeling of "openness" due to the complete lack of walls or other continuous barriers on three sides. As can be seen, with all available walls or panels deployed, only one of the four sides of the frame 12 remains enclosed (e.g., by a wall or panel). It should be appreciated that further implementations in which only one or two sides are deployable are also possible. In addition, some implementations could include one or more deployable side/end panels or walls having a length that is less than the length/width of the frame 12.

In some implementations, one or more of the deployable side and end walls or panels are formed at least in part by a sheet material attached to a wall frame. Turning to FIG. 2B, each of the deployable walls 26, 28, 30 is formed in part from a sheet material 34 attached to a wall frame that includes an outer frame 36 and crossbars 38 extending from one side of the outer frame 36 to the other side. The sheet material 34 may be attached to the wall frame as a single piece or in multiple pieces depending upon the desired configuration. In some cases, the exterior sheet material 34 is transparent or translucent in order to pass light. For example, in some cases the sheet material can be glass, acrylic, polycarbonate, or another material known to transmit a desired amount of light. A transparent or translucent sheet material is not required in all cases, though, and it should be appreciated that opaque side and end walls/panels are also contemplated for some implementations.

Figure 3B:
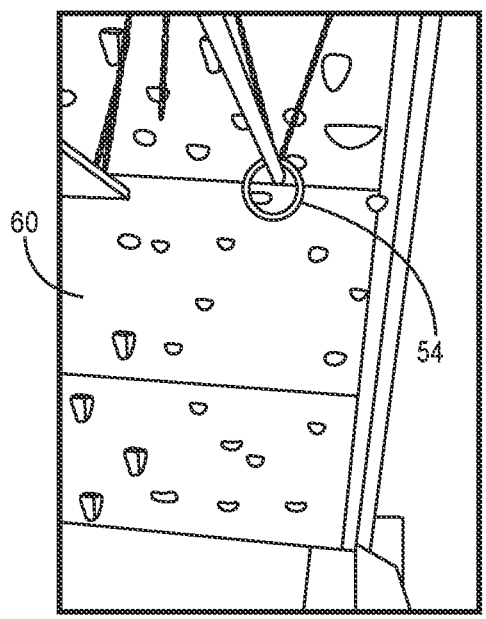

Referring further to FIGS. 2A-2D and 3A-3B, various activity devices (e.g., "obstacles" or "obstacle devices") can be disposed on or attached to either the top frame assembly 32 and/or the deployed panels 26, 28, 30. For example, the activity devices can include a climbing net 50 (as best shown in FIG. 2D), a swinging handle 52 (FIG. 2D), swinging rings 54 (FIGS. 2D and 3B), rolling monkey bars (also called a "hamster wheel") 56 (FIG. 3A), climbing ropes 58 (FIG. 2D), a warp wall 44 (FIG. 2D), and a climbing wall 60 (FIG. 3B). It is understood that any other known obstacle devices can be incorporated into the system 10. It is further understood that, in certain implementations, the various activity devices are removeable, moveable, and/or interchangeable. For example, the activity or obstacle devices can be removably attached to portions of the top frame assembly 32 such as, for example, the top outer frame 33 and crossbars 35) or to the outer frame and crossbars of the side and end panels 26, 28, and 30 with clips or other removable fasteners. The ability to move activity devices means that an obstacle course supported by the deployed frame 12 can be easily reconfigured into various configurations with various obstacles provided in variable locations.

According to certain embodiments, the expanded nature of the system 10 in its deployed configuration allows for an increase in the amount of space provided for the obstacle course, and thus a larger obstacle course with more obstacles for participants. That is, the deployable panels 26, 28, 30 allow for maximization of the space available for the obstacle course. More specifically, once the panels 26, 28, 30 are deployed into their expanded positions, various obstacle devices can be attached not only to the top frame assembly 32, but also to the deployed panels 26, 28, 30. As a result, the space dedicated to obstacles expands from the footprint of the undeployed frame 12 to the footprint of the deployed system 10 with the panels 26, 28, 30 in their deployed positions.

As best shown in the deployed configuration of FIGS. 2C and 2D, certain system embodiments include mats (or "cushions") 42 that can be deployed or placed under the deployed panels 26, 28, 30 to provide additional protection. That is, the mats 42 are disposed for the benefit of participants who are using any of the obstacle devices that are positioned under or attached to the expanding panels 26, 28, 30. In one embodiment, each mat 42 is designed to prevent a concussion in the event that a user falls onto such mat 42. More specifically, the specific dimensions of the mat 42 (including thickness, etc.) and the material used therein have been selected to reduce or prevent a concussion when a user falls thereon. For example, the width and length of each mat 42 are configured to cover the full area under each obstacle such that the size of an obstacle or space taken up by an obstacle can determine the size of the mat 42. Further, the depth or thickness of each mat 42 is determined based on the distance that a user might fall. Thus, a mat 42 disposed under an obstacle disposed at a significant height from the ground (and thus the mat 42) such that a user would fall a significant distance would be relatively thick and/or the density of the foam material therein would be relatively dense. Alternatively, a mat 42 disposed under an obstacle that is disposed close to the ground (and thus the mat 42) would have, by comparison, less thickness and/or less dense foam material.

Figure 4A:
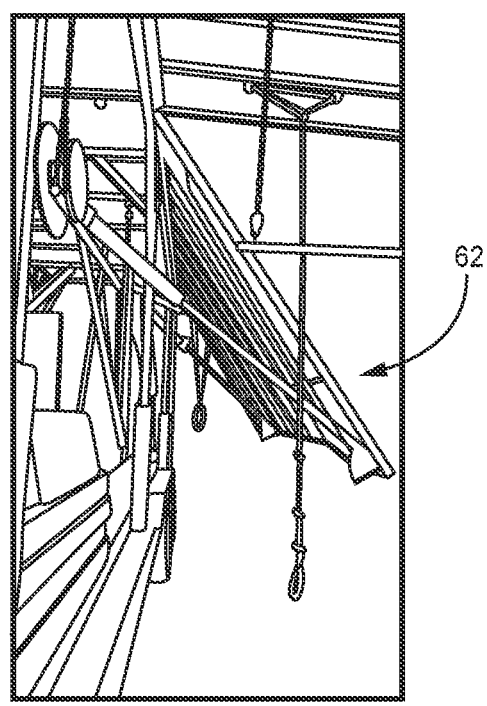
FIGS. 4A-4C are elevation views depicting the deployment of a side wall according to an embodiment.
Figure 4B:
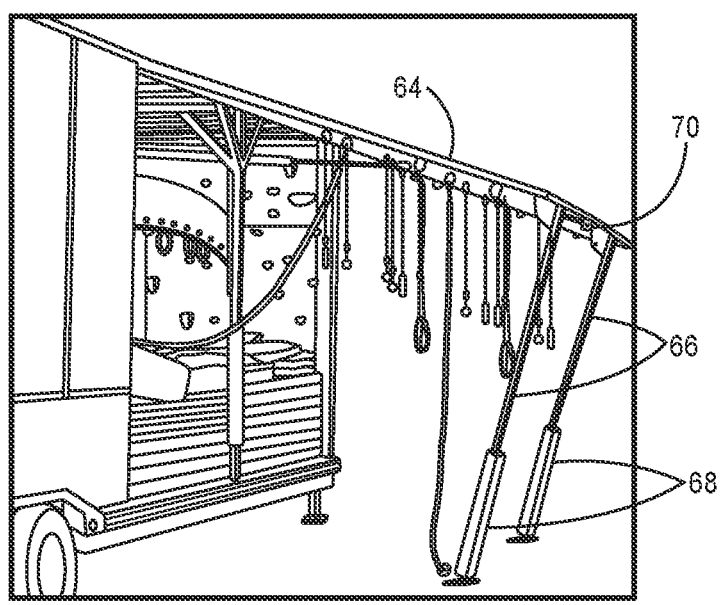
Figure 4C:
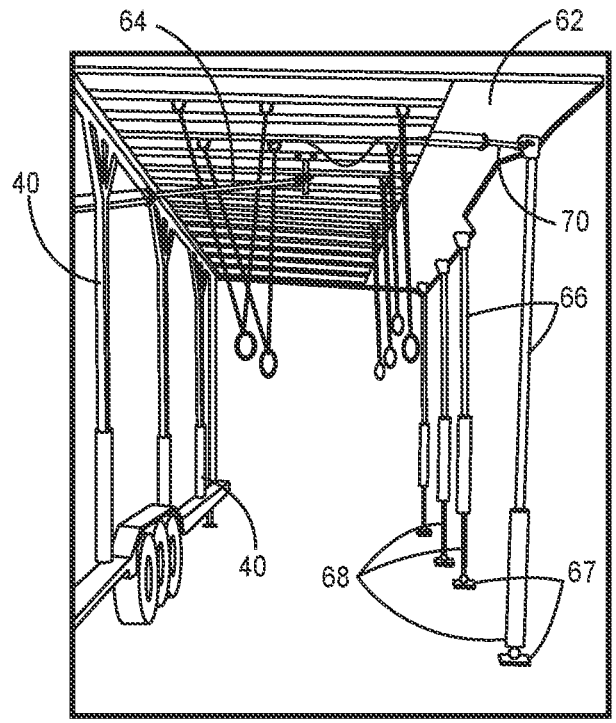

The operation of the deployable panels 26, 28 will now be discussed in further detail. More specifically, a representative panel 62 (which is intended to represent any of panels 26A, 26B, 28A, 28B) is shown being deployed into its deployed configuration in FIGS. 4A-4C, according to one embodiment. More specifically, in FIG. 4A, the panel 62 is being urged from its retracted or undeployed configuration (in which the panel 62 is generally parallel to the vertical supports 40) to its deployed configuration (in which the panel 62 is generally transverse to the longitudinal axes of the vertical supports 40). As the panel 62 is extended further as shown in FIG. 4B toward its deployed configuration, panel legs 66 are deployed beneath the panel 62 as shown. In the depicted implementation, the panel legs 66 are elongated support members with one end rotatably or hingedly attached near an edge of the panel 62 opposite from the top frame assembly 32. The other end of each panel leg 66 includes a base 67. In FIG. 4C, the panel 62 is disposed in its deployed configuration, with the panel legs 66 rotated to be in substantially vertical positions such that the base 67 of each leg 66 is disposed in a substantially flat position on the ground as shown.

In one implementation, each of the panel legs 66 is adjustable such that the length of the leg 66 can be adjusted to allow for elevation differences in the area on which the system 10 is positioned. In other words, regardless of the elevation of the ground, the length of each leg 66 can be adjusted such that the base 67 is disposed on the ground. The adjustability in these cases enables each leg 66 to support the panel 62 at the same height in its deployed position. As an example, in some cases the length of each leg 66 can be manually adjusted (e.g., via telescoping members) to ensure that the panel 62 is substantially level and coplanar with the top frame assembly 32.

According to certain embodiments, an actuable piston forms part of each leg 66. As shown in FIGS. 4B-4C, an actuable piston 68 forms the free end of each leg 66 (opposite the attachment to the panel 62) and the base 67 is attached to the end of the piston 68. As will be appreciated, the actuable pistons 68 can be actuated to lengthen and shorten the legs 66. As an example, FIG. 4B shows panel legs 66 with their actuable pistons 68 in a shortened or retracted state. Turning to FIG. 4C, it can be seen that the legs 66 have been lengthened by actuating their respective pistons 68 into an extended state. It is understood that the actuable piston can be any known actuable piston, such as, for example, any hydraulic or pneumatic piston, including a tie rod cylinder.

Figure 5:
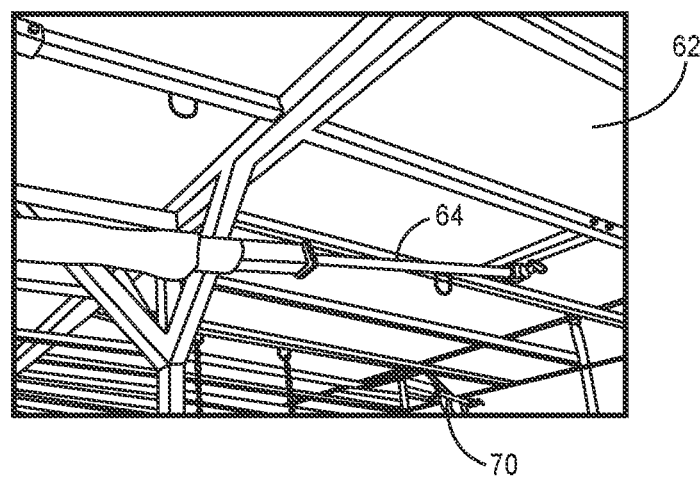
FIG. 5 is an illustration of an actuable piston and a deployed side wall according to an embodiment.

In certain embodiments as best shown in FIGS. 4B and 4C, each panel 62 has an actuable piston 64 coupled to the panel 62 and the frame 12 such that the piston 64 can be used to urge the panel 62 from the retracted position to the deployed position and then allow the panel 62 to return to the retracted position. In one embodiment, the actuable piston 64 is a hydraulic piston 64 that can be automatically actuated to extend and/or retract via a wired or wireless controller (e.g., a remote with an actuation button). Alternatively, the actuable piston 64 can be any type of piston that can be actuated in any known fashion. The piston 64 allows for each panel 62 to be deployed and retracted by one person without any assistance. The piston 64, according to one example, is depicted in FIGS. 4B, 4C, and 5. In a further embodiment, no pistons are required to deploy the panels.

In some implementations, actuable pistons are used to deploy one or more panel legs 66. Actuable pistons are not required for every implementation, though in some cases such devices assist in setting up and taking down the panels and panel legs. As shown in FIGS. 4A-5, actuable pistons 70 are coupled to the representative panel 62 and respective legs 66. Operating one of the pistons 70 urges the associated panel leg 66 to rotate away (e.g., to unfold) from the panel 62 into a deployed position in which the leg 66 is positioned substantially vertically when the panel 62 is in the deployed position. Retracting the piston 70 pulls the corresponding panel leg 66 back toward the panel 62 into a retracted position.

As noted elsewhere, implementations that incorporate one or more actuable pistons can utilize any known actuable piston. Possible examples include, but are not limited to, hydraulic and pneumatic pistons, including tie rod cylinders, and other types of known mechanical actuators. Further, it will be appreciated that the use of actuable pistons also includes the use of other known components of such actuation systems such as, for example, pumps, reservoirs, and valves for hydraulic systems. Pressurized fluid lines or hoses are also used in some cases, as is depicted for various actuable pistons in the drawings.

Figure 6A:
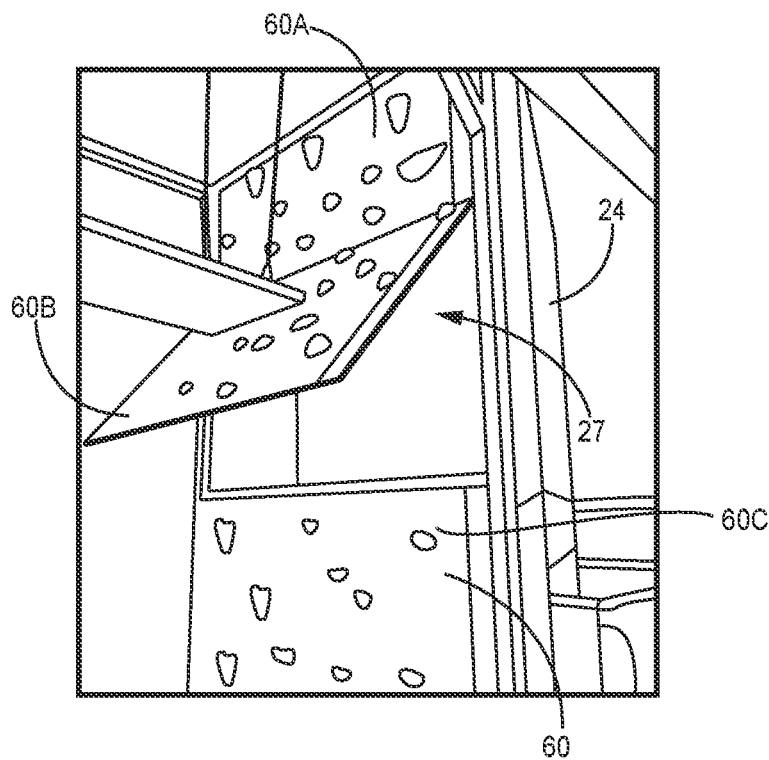
FIGS. 6A-6B are views of a storage unit of the mobile activity system of FIG. 1 according to an embodiment.
Figure 6B:
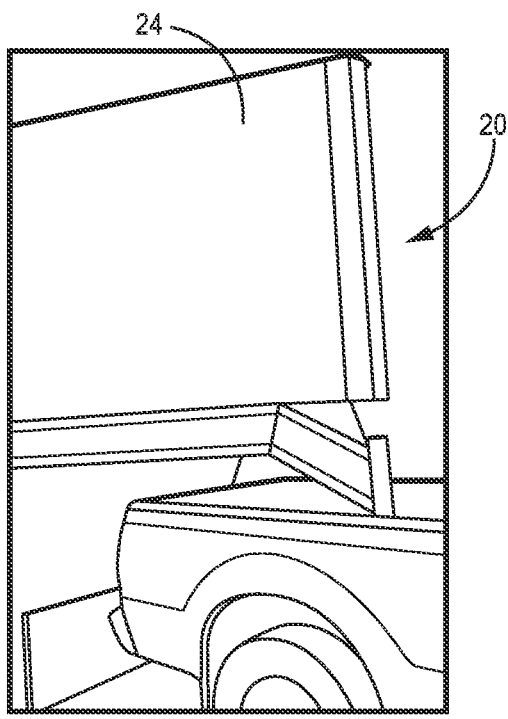

As shown in FIGS. 6A and 6B, according to certain alternative implementations, the climbing wall 60 is disposed on the rear wall of the storage unit 24. Further, the climbing wall 60 in this embodiment is made up of three panels 60A, 60B, 60C that are hingedly coupled to the storage unit 24 such that each serves as an access point for an internal portion 27 of the storage unit 24. More specifically, in one embodiment, the storage unit 24 is divided into three separate sections such that each panel 60A, 60B, 60C provides access to a different storage section. In a further alternative, the climbing wall 60 can have only one panel 60B (or two) that provides access to the interior 27 of the storage unit 24. Alternatively, the obstacle on the storage unit 24 need not be a climbing wall 60. It is understood that any known obstacle or feature can be disposed on or positioned adjacent to the storage unit 24. The various system 10 embodiments herein are not limited to a climbing wall 60 as shown.

Figure 7A:
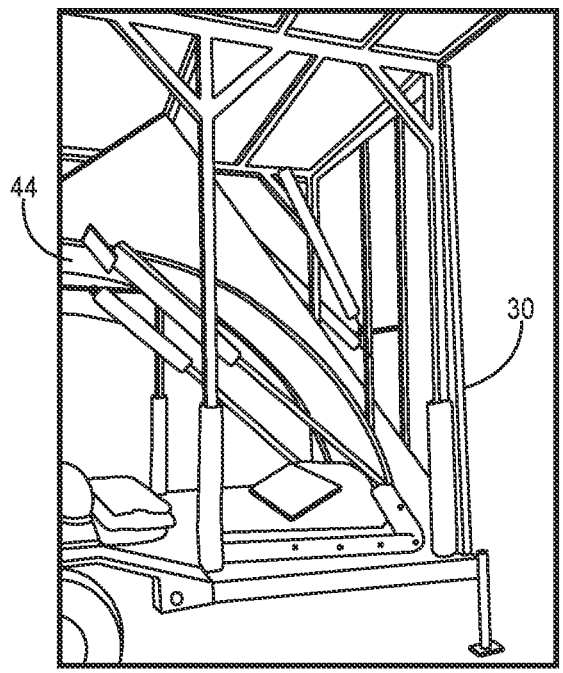
FIGS. 7A-7D are elevation views depicting the deployment of a deployable obstacle according to an embodiment.
Figure 7B:
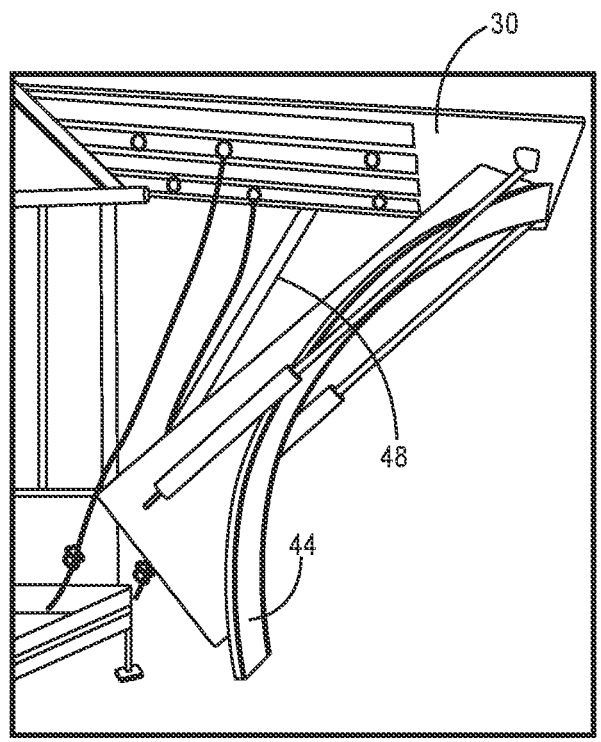
Figure 7C:
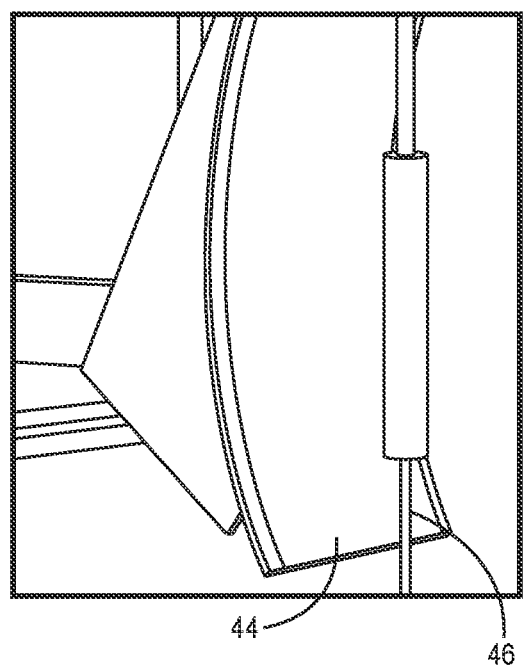
Figure 7D:
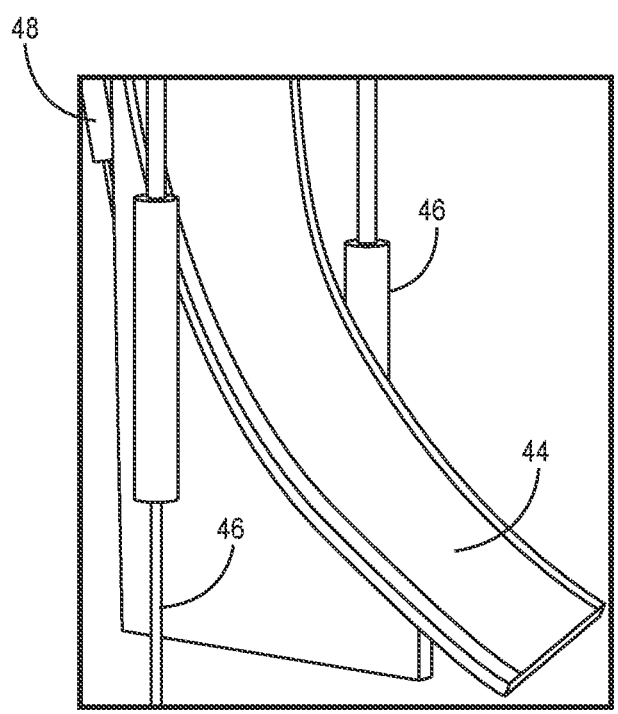

In accordance with certain alternative embodiments, at least one activity or obstacle device can be deployably attached to one of the panels 26, 28, 30 such that the obstacle is deployed when the panel 26, 28, 30 is deployed. In one specific implementation, the obstacle is the warp wall 44 that is deployably coupled to the end panel 30. Deployment of the end panel 30 and the warp wall 44 is depicted in FIGS. 7A-7D, according to one embodiment. As shown in FIG. 7A, in the retracted configuration, the warp wall 44 is disposed within the frame 12 and the end wall 30 is disposed on the rear end 22 of the frame 12 and attached thereto. In this configuration, the system 10 can be transported easily from one location to another with the warp wall 44 conveniently disposed within the trailer 10. When the system 10 has arrived at a new location for deployment and is positioned in the desired location, the panel 30 (and panels 26, 28) is urged toward its deployed position. As best shown in FIG. 7B, as the panel 30 is urged toward its deployed position, the warp wall 44, which is rotatably attached to the panel 30, is also urged out of the frame 12 as shown. Once the legs 46 of the end panel 30 are disposed on the ground as desired (as best shown in FIGS. 7C, 7D, and 2D), the warp wall 44 is urged toward its deployed position as shown in FIG. 7C by actuation of the warp wall actuable piston 48 (as best shown in FIGS. 7B and 7D). In FIG. 7D, the actuable piston 48 has been extended such that the warp wall 44 is in its deployed position and is resting on the ground as shown (in both FIGS. 7D and 2D).

In use, according to one embodiment, the mobile deployable activity systems disclosed or contemplated herein, including system 10, can be operated in the following fashion. In its retracted or undeployed configuration as shown in FIG. 1, the system 10 can be transported, including at high speed, to any desirable location. More specifically, the panels 26, 28, 30 are in their retracted positions and are attached to the frame 12 according to any known fashion such that all of the obstacle devices are contained and retained therein during transport. According to certain implementations, the panels 26, 28, 30 can be attached to the frame 12 such that the system 10 is substantially waterproof and windproof.

In one embodiment, the trailer 10 can be hauled by any type of prime mover, including a pickup truck or semi-truck or any other such prime mover. It is understood that the hitch 18 can be any appropriate hitch for coupling to any desirable prime mover.

Once the system 10 is positioned as desired, the system 10 can be deployed as described above such that the panels 26, 28, 30 are urged into their deployed configurations such that users can utilize the obstacle devices that are disposed within and/or attached to the top frame assembly 32 and/or the panels 26, 28, 30. When it is time to move on, the various devices can be stored in the frame 12 or the storage unit 24 and the panels 26, 28, 30 retracted back into their retracted or transport positions.

Although the various embodiments have been described with reference to preferred implementations, persons skilled in the art will recognize that changes may be made in form and detail without departing from the spirit and scope thereof.

What is claimed is:

1. A deployable mobile trailer comprising:
   (a) a base comprising wheels rotatably coupled to the base;
   (b) a frame attached to the base, the frame comprising:
      (i) vertical supports attached to the base; and
      (ii) a top frame assembly disposed at a top end of the vertical supports;
   (c) a first elongate deployable wall rotatably attached to a first side of the frame, the first elongate deployable wall comprising a retracted position and a deployed position such that the first elongate deployable wall is moveable between the retracted position and the deployed position;
   (d) a second elongate deployable wall rotatably attached to a second side of the frame, the second elongate deployable wall comprising a retracted position and a deployed position such that the second elongate deployable wall is moveable between the retracted position and the deployed position;
   (e) a deployable end wall rotatably attached to an end of the frame, the deployable end wall comprising a retracted position and a deployed position such that the deployable end wall is moveable between the retracted position and the deployed position;
   (f) a plurality of activity devices removably attached to the top frame assembly, the first elongate deployable wall, the second elongate deployable wall, or the deployable end wall; and
   (g) a deployable activity device comprising a warp wall deployably attached to a deployable panel such that the activity device is
      (i) disposed within the frame when the deployable panel is in the retracted position; and
      (ii) urged into an activity device deployed position when the deployable panel is urged into the deployed position,
   wherein the deployable panel is the deployable end wall.

2. The deployable mobile trailer of claim 1, further comprising:
   (a) a climbing wall, and
   (b) a storage unit disposed at an end of the frame opposite from the deployable end wall,
   wherein the climbing wall forms a wall of the storage unit and provides access to an internal portion of the storage unit.

3. The deployable mobile trailer of claim 1, wherein at least one of the first elongate deployable wall and the second elongate deployable wall comprises a first side panel and a second side panel, wherein the first and second side panels are separately deployable.

4. The deployable mobile trailer of claim 1, wherein each of the first elongate deployable wall, the second elongate deployable wall, and the deployable end wall comprises a plurality of panel legs, each panel leg deployed beneath and supporting its respective deployable wall in the deployed position and retracted within the frame in the retracted position.

5. The deployable mobile trailer of claim 1, further comprising:
   (a) a first actuable piston coupled to the first elongate deployable wall and the frame and operable to move the first elongate deployable wall between its retracted position and its deployed position;
   (b) a second actuable piston coupled to the second elongate deployable wall and the frame and operable to move the second elongate deployable wall between its retracted position and its deployed position; and
   (c) a third actuable piston coupled to the deployable end wall and the frame and operable to move the deployable end wall between its retracted position and its deployed position.

6. The deployable mobile trailer of claim 1, wherein:
   (a) the deployable end wall is rotatably attached to a first end of the frame and further comprising a second end wall attached to a second end of the frame opposite from the first end of the frame;
   (b) the first elongate deployable wall extends along the first side of the frame from the deployable end wall to the second end wall;
   (c) the second elongate deployable wall extends along the second side of the frame from the deployable end wall to the second end wall; and
   (d) the deployable end wall extends along the first end of the frame from the first side of the frame to the second side of the frame.

7. The deployable mobile trailer of claim 1, wherein each of the first elongate deployable wall, the second elongate deployable wall, and the deployable end wall comprises a translucent or transparent sheet material attached to a wall frame.

8. A mobile activity structure, comprising:
   (a) a base comprising wheels rotatably coupled to the base;
   (b) a frame attached to the base, the frame comprising:
      (i) vertical supports attached to the base; and
      (ii) a top frame assembly disposed at a top end of the vertical supports;
   (c) a deployable end wall rotatably attached to a first end of the top frame assembly, the deployable end wall comprising:
      (i) a retracted position and a deployed position such that the deployable end wall is moveable between the retracted position and the deployed position; and
      (ii) an actuable piston coupled to the deployable end wall and the frame and operable to move the deployable end wall between the retracted position and the deployed position;
   (d) a second end wall attached to a second end of the top frame assembly opposite from the first end of the top frame assembly;
   (e) a deployable side wall rotatably attached to a side of the top frame assembly, extending along the side of the frame from the deployable end wall to the second end wall, the deployable side wall comprising:
      (i) a retracted position and a deployed position such that the deployable side wall is moveable between the retracted position and the deployed position; and
      (ii) an actuable piston coupled to the deployable side wall and the frame and operable to move the deployable side wall between the retracted position and the deployed position; and
   (f) a plurality of activity devices removably attached to the top frame assembly, the deployable end wall, or the deployable side wall.

9. The mobile activity structure of claim 8, further comprising a deployable activity device deployably attached to the deployable end panel such that the activity device is
   (a) disposed within the frame when the deployable end panel is in the retracted position, and
   (b) deployed when the deployable end panel is in the deployed position.

10. The mobile activity structure of claim 8, further comprising a storage unit disposed at the second end of the frame, wherein:
    (a) the second end wall forms one side of the storage unit;
    (b) the second end wall comprises a climbing wall; and
    (c) at least a portion of the second end wall is movably attached to the second end of the frame, thereby providing access to an internal portion of the storage unit.

11. The mobile activity structure of claim 8, wherein the deployable side wall is a first deployable side wall rotatably attached to a first side of the frame, and further comprising a second deployable side wall rotatably attached to a second side of the frame, wherein the second deployable side wall extends along the second side of the frame from the deployable end wall to the second end wall, the second deployable side wall comprising:
    (a) a retracted position and a deployed position such that the second deployable side wall is moveable between the retracted position and the deployed position; and
    (b) an actuable piston coupled to the second deployable side wall and the frame and operable to move the second deployable side wall between the retracted position and the deployed position.

12. The mobile activity structure of claim 11, wherein each of the first deployable side wall, the second deployable side wall, and the deployable end wall comprises a plurality of panel legs, each panel leg deployed beneath and supporting its respective deployable wall in the deployed position and retracted within the frame in the retracted position.

13. A method for operating a mobile deployable activity structure, comprising:
    (a) transporting a mobile activity structure in an undeployed configuration to a desired location, the mobile activity structure comprising a plurality of deployable walls rotatably attached to a frame supported by a rollable base, the frame comprising a top frame assembly;
    (b) moving a first elongate deployable wall from a retracted position adjacent a first side of the frame to a deployed position;
    (c) moving a second elongate deployable wall from a retracted position adjacent a second side of the frame to a deployed position;
    (d) moving a deployable end wall from a retracted position adjacent a first end of the frame to a deployed position, whereby a deployable activity device rotatably attached to the deployable end wall is moved from a retracted position within the frame to a deployed position outside the frame; and
    (e) removably attaching a plurality of activity devices to one or more of the top frame assembly and the plurality of deployable walls in the deployed positions, wherein at least one of the plurality of activity devices is attached to at least one of the plurality of deployable walls such that the at least one activity device is disposed under the deployable wall.

14. The method of claim 13, wherein the deployable activity device is a warp wall.

15. The method of claim 13, further comprising accessing an internal portion of a storage unit disposed at a second end of the frame by moving at least a portion of a climbing wall that forms a wall of the storage unit.

16. The method of claim 13, further comprising:
    (a) deploying the first elongate deployable wall by rotating first and second side panels of the first elongate deployable wall from the retracted position to the deployed position; and
    (a) deploying the second elongate deployable wall by rotating first and second side panels of the second elongate deployable wall from the retracted position to the deployed position.

17. The method of claim 13, further comprising:
    (a) moving the first elongate deployable wall from the deployed position into the retracted position;
    (b) moving the second elongate deployable wall from the deployed position into the retracted position;
    (c) moving the deployable end wall from the deployed position into the retracted position; and
    (d) transporting the mobile activity structure in the undeployed configuration to a new desired location.

* * * * *